June 30, 1931.  G. FLINTERMANN  1,811,923
FLEXIBLE SUPPORT
Filed Aug. 19, 1927   2 Sheets-Sheet 1
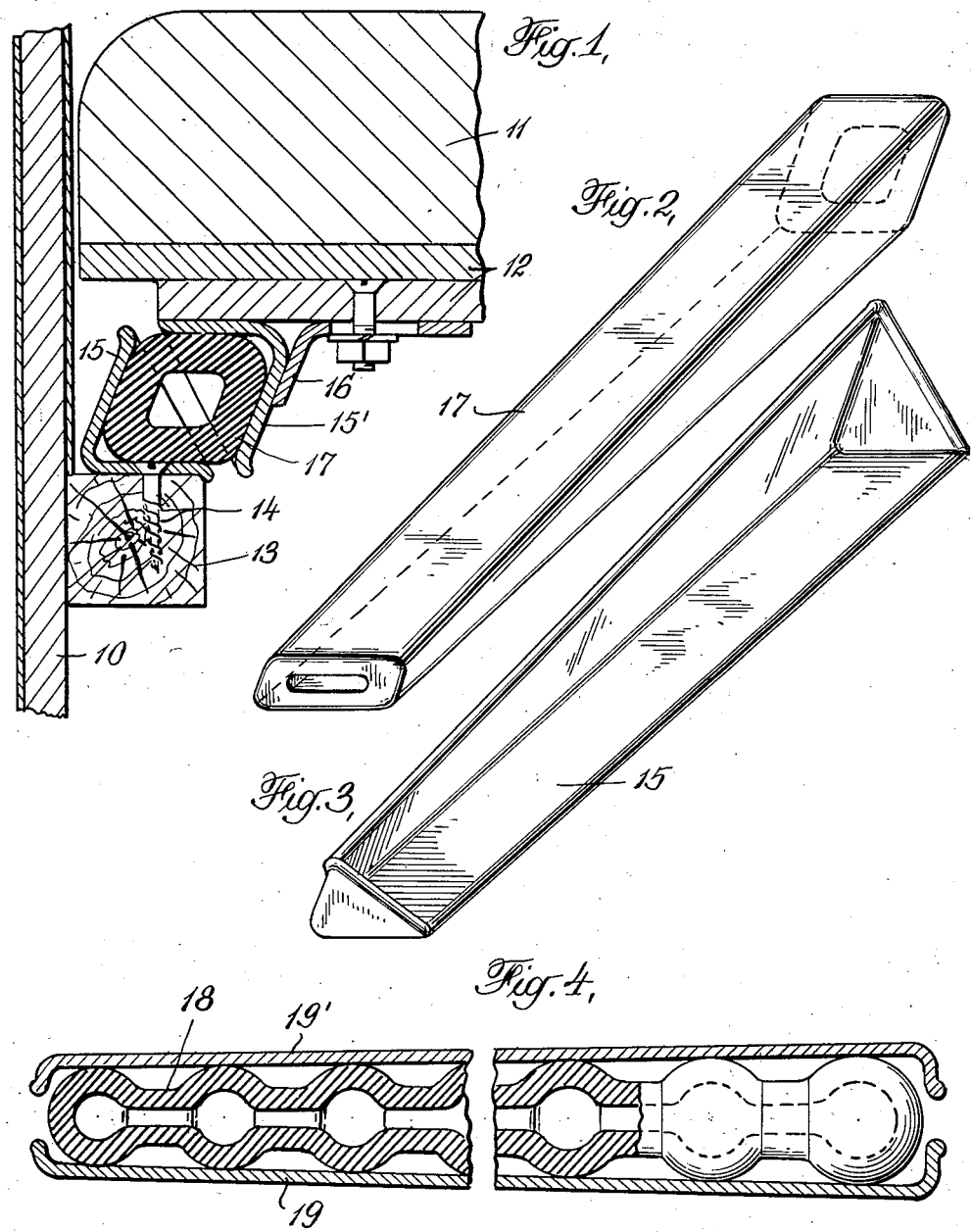

June 30, 1931.    G. FLINTERMANN    1,811,923
FLEXIBLE SUPPORT
Filed Aug. 19, 1927    2 Sheets-Sheet 2
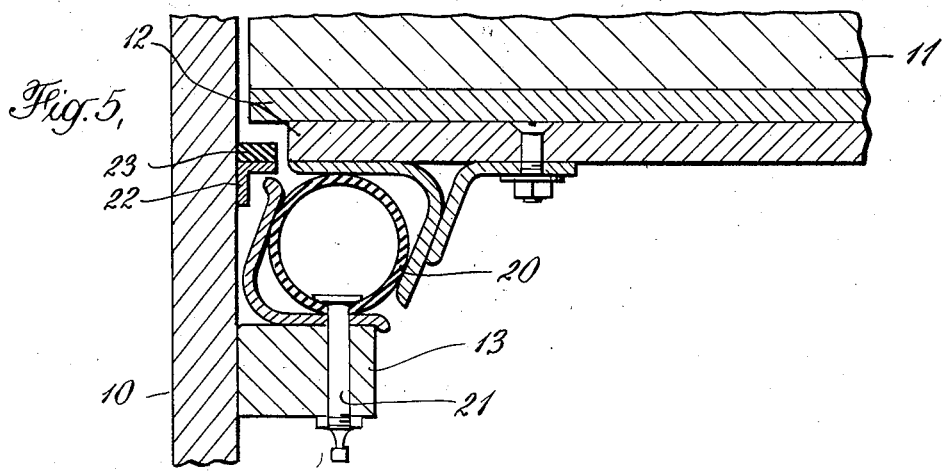
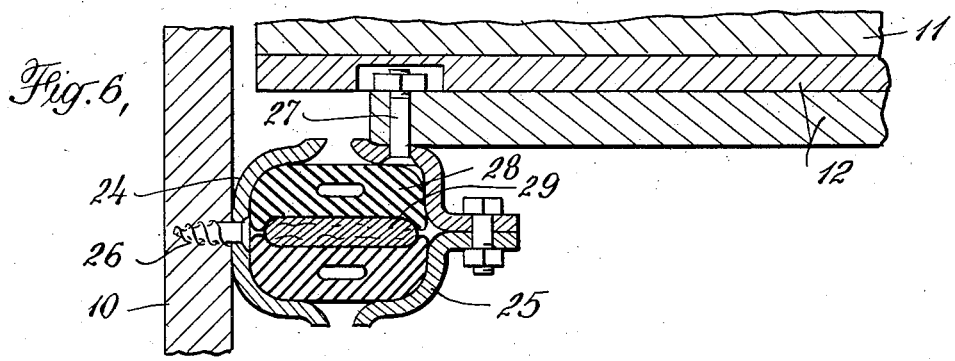
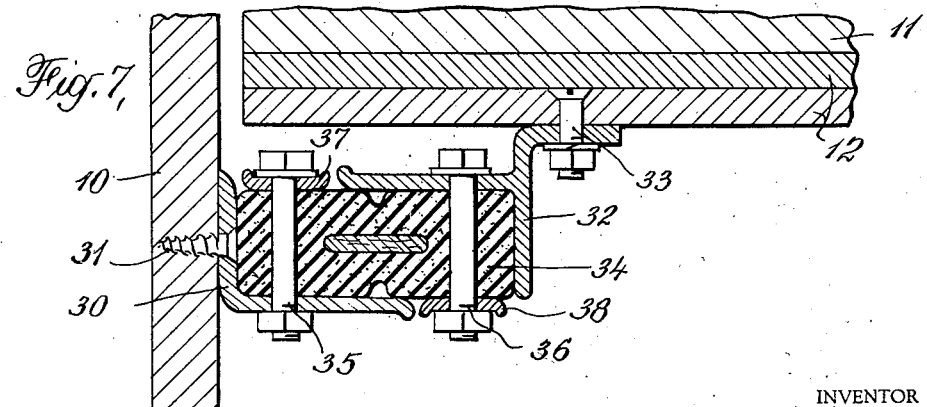
INVENTOR
Gerhard Flintermann
BY
Bauer, Davis, Marvin & Edmonds
ATTORNEYS Patented June 30, 1931

1,811,923

UNITED STATES PATENT OFFICE

GERHARD FLINTERMANN, OF WEST ORANGE, NEW JERSEY

FLEXIBLE SUPPORT

Application filed August 19, 1927. Serial No. 214,129.

This invention relates to flexible supports and has particular reference to means for flexibly supporting seats such as are used in theatres, railway cars, automobile busses, trucks and similar places and has for its object to provide a seat for such purposes which is resiliently supported in an improved way. Numerous expedients have been employed to procure non-vibrating supports for seats and the like but these expedients employ expensive and complicated mechanical apparatus which requires periodic attention and frequently gets out of order. For example, it has been proposed to resiliently support seats of various kinds by utilizing springs but springs having the necessary physical properties are difficult to adapt to the relatively small confines of a seat, and furthermore, springs have an objectionable rebound which, in some instances, increases the vibration which it is sought to eliminate.

According to the present invention, a seat is supported on one or more flexible joints between the relatively movable parts of which is disposed a body of flexible material such as rubber or other resilient body. By constructing resilient supports for seats in the manner of the present invention, no material changes are necessary in the ordinary form of seat construction inasmuch as the device of this invention is compact, invisible and requires but few additional parts.

For a better understanding of the invention, reference is made to the accompanying drawings in which Figure 1 is a transverse cross-section of a vehicle seat employing the flexible support of this invention;

Fig. 2 is a prospective view of one form of resilient member;

Fig. 3 illustrates one of the supporting elements for the resilient member shown in Fig. 2;

Fig. 4 is a modified form of resilient member shown in its support; and

Figs. 5, 6 and 7 show modified forms of resilient members in connection with a vehicle seat.

In the drawings, numeral 10 designates the side of a vehicle, for example, while numeral 11 indicates a cushion seat which is mounted on the customary base 12. Along one side of the seat and suitably secured to the side of the vehicle 10 is a bracket 13. Securely fastened to this bracket by means of a screw 14 or the like is a trough-shaped supporting element 15 which is shown in perspective in Fig. 3. A corresponding trough-shape element 15' is arranged opposite to element 15 and is fastened to seat base 12 by means of suitable lugs 16. Disposed between elements 15 and 15' is the resilient member 17 which is particularly shown in perspective in Fig. 2. This resilient element may consist of a hollow block of live rubber which is preferably tapered from one end to the other. Accordingly, as is indicated in Fig. 1, the load on the seat is transmitted to resilient member 17 since there is no other connection between elements 15 and 15'. Consequently, any vibration of the vehicle or of seat 11 is accompanied by a relative movement between elements 15 and 15' which is absorbed by resilient member 17.

In Fig. 4 is illustrated a modified form of resilient member which is substantially a hollow, tapered rod 18 provided with a number of annular beads, these beads engaging supporting elements 19 and 19' which correspond respectively to elements 15 and 15' as shown in Fig. 1. The use of a resilient member shaped as illustrated in Fig. 4 and preferably tapered permits of ready flowing of the live rubber under load since compression of the beads of resilient member 18 causes them and the members as a whole to flatten out and thus a greater degree of resiliency is obtained.

In the modification illustrated by Fig. 5, the resilient member comprises a pneumatic tube 20 which may be supplied with compressed air through a suitable pneumatic valve 21 mounted in bracket 13. In order to provide for the deflation of pneumatic tube 21, the bracket 22 is mounted beneath seat base 12 and is provided with a rubber pad 23. Accordingly, when tube 20 contains insufficient air to properly support the seat 11, the seat will rest upon bracket 22 and pad 23 until tube 20 is re-inflated. In the form of resilient seat support illustrated in Fig. 6, the brackets are replaced by U-shaped elements 24 and 25, the former being fastened to the side of the vehicle 10 by any suitable means such as screw 26 while element 25 is made in two parts for ready assembling, and is rigidly fastened to seat base 12 by means of bolts 27. In the space formed between U-shaped elements 24 and 25 is provided a resilient member which includes a transverse web 29 of fabric or other stiffening material which is adapted to stiffen member 28 and prevent breaking or tearing of the same under excessive loads. It will be seen that in operation any relative movement between the side of the vehicle 10 and seat 11 is accompanied by a corresponding relative movement between U-shaped elements 24 and 25, this movement being absorbed by the resilient member 28.

Figure 7 illustrates a construction similar to that illustrated in Fig. 6 except that L-shaped supporting elements are employed. Element 30 is attached to the side of the vehicle 10 by any suitable means such as screws 31 while element 32 is secured to seat base 12 by means of bolts 33. The resilient member 34 is placed between elements 30 and 32 and is secured in place by bolts 35 and 36 which pass through the elements 30 and 32, respectively, as well as through resilient member 34. Suitable washers 37 and 38 are placed against the exposed surfaces of resilient member 34 under the members of corresponding bolts 35 and 36, respectively, and stiffening web 38 is provided longitudinally of resilient member 34 for the purpose of preventing breakage thereof by excessive loads on seat 11 which cause relative movement between elements 30 and 32.

It will be seen that the present invention provides an economical, compact and efficient flexible support for seats of all kinds but it is to be understood that this flexible support may have other applications for supporting objects or loads of various kinds and especially such objects or loads which are subjected to shocks and vibration. The elongated shape of the joint enables a cushioning effect to be obtained over a large area in spite of the fact that the joint occupies a small space. Inasmuch as the joint is preferably disposed along the sides of the seat, no foot room is sacrificed, thus ensuring maximum comfort to the person occupying the seat. Furthermore, that while particular ways of attaching the resilient support of this invention to seats or other objects are already illustrated, it is to be understood that the invention is susceptible to various modifications to adapt it to different conditions of use and that such changes as may be necessary can be made without departing from the invention as defined by the appended claims.

I claim:

1. A flexible support comprising an elongated resilient member, means connected to a load engaging the member longitudinally, and means for holding the member longitudinally, said means being spaced transversely of the direction of the load for relative movement in the direction of the load.

2. A flexible support comprising an elongated resilient body, means connected to the load and engaging said body substantially along its length, means for supporting said body substantially along its length, said body being arranged in said means transversely of the direction of the load.

3. A flexible support comprising a channel-shaped loaded member, a second channel-shaped rigid member, said members being spaced apart transversely of the direction of the load, and a resilient body mounted between said members and adapted to flex transversely of its length.

4. A flexible support comprising a pair of angle-shaped members oppositely arranged to form an elongated inclosure, one of said members being connected to the load and the other member being rigidly supported, a resilient body partially enclosed by said members, said body being adapted to allow a limited relative movement of said members under load.

5. A flexible support comprising an elongated resilient body, said body having longitudinal openings to increase the resiliency, supporting members on opposite sides of the body, said members being mounted for relative movement transversely of the body under load.

6. A flexible support comprising a resilient member, means connected to a load and to the member and means connected to the member for supporting the same, said resilient member extending in a plane substantially parallel to the direction of the load and said supporting means being spaced apart in a direction transversely of the direction of the load and substantially at right angles to the plane in which the resilient member extends whereby said resilient member is subjected to a transverse shearing stress by said load.

In testimony whereof I affix my signature.

GERHARD FLINTERMANN.